F. H. SEELY.
AIR PIPE COUPLING FOR TRAINS.
APPLICATION FILED AUG. 12, 1915.
1,187,184.
Patented June 13, 1916.
3 SHEETS—SHEET 1.
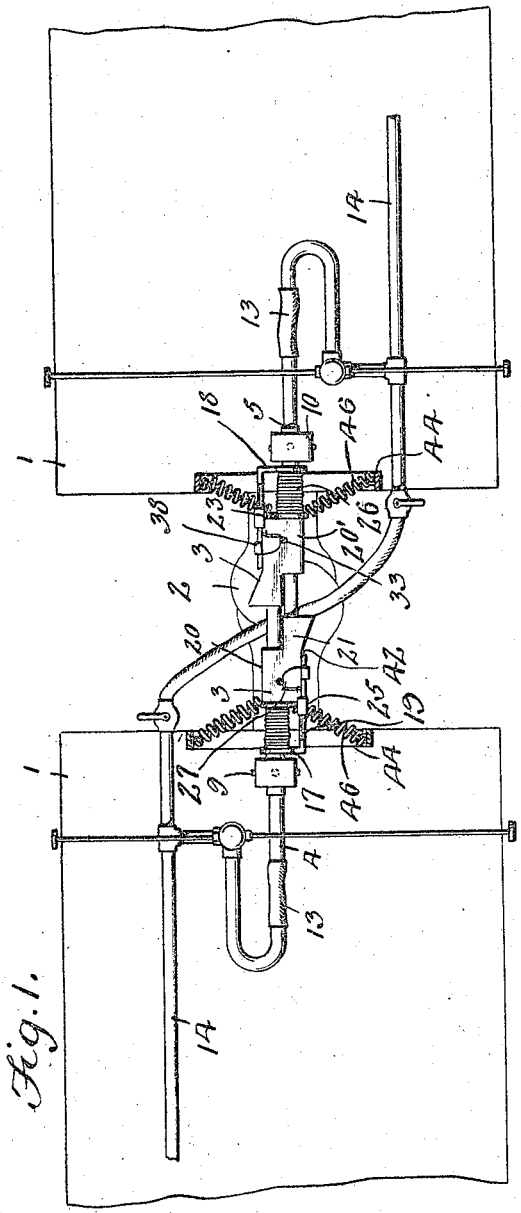
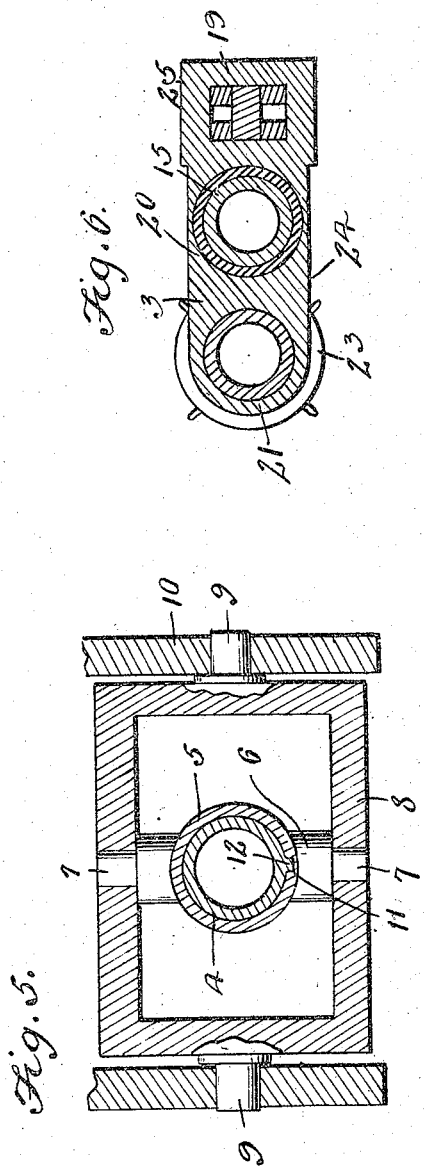

F. H. SEELY.
AIR PIPE COUPLING FOR TRAINS.
APPLICATION FILED AUG. 12, 1915.
1,187,184.
Patented June 13, 1916.
3 SHEETS—SHEET 2.
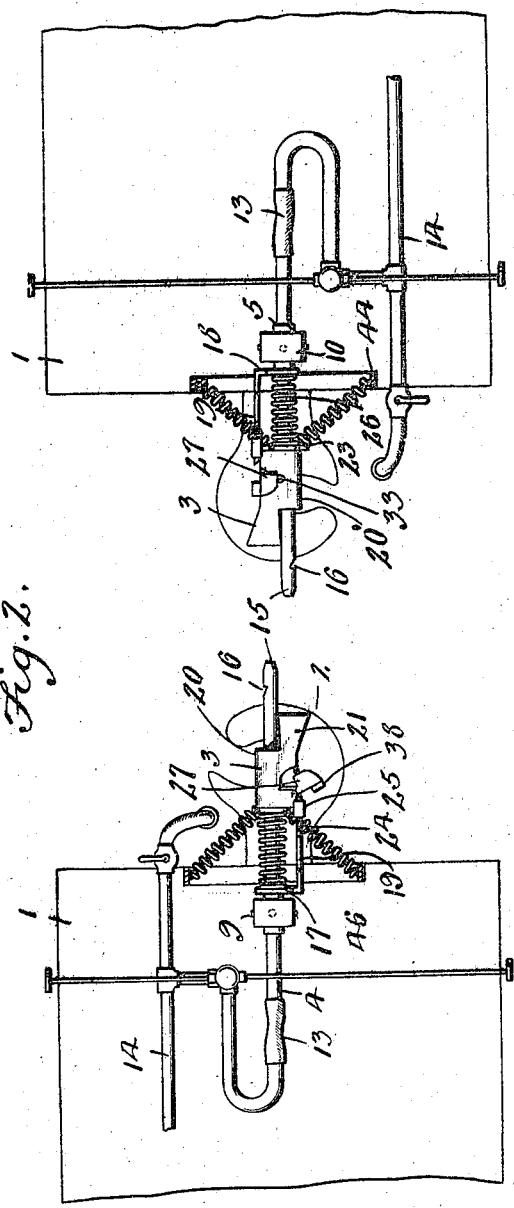
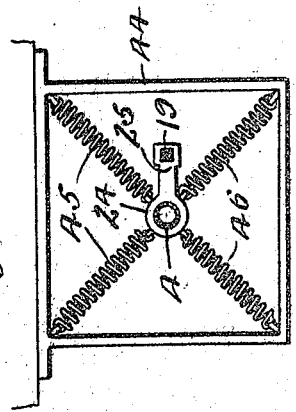
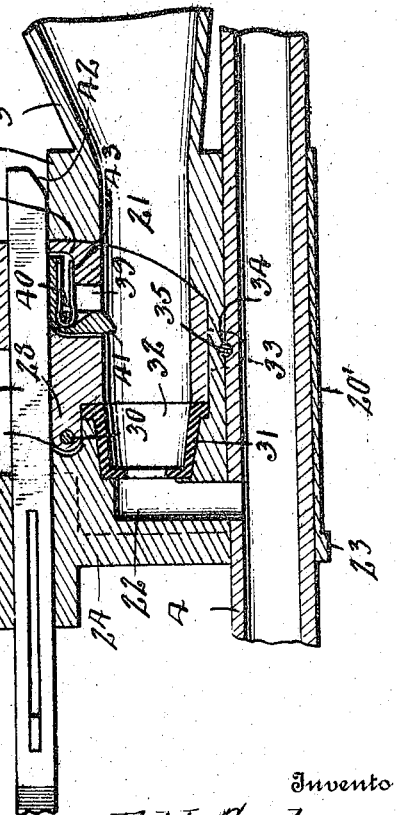
Witnesses
Inventor
F. H. Seely,
By Victor J. Evans
Attorney

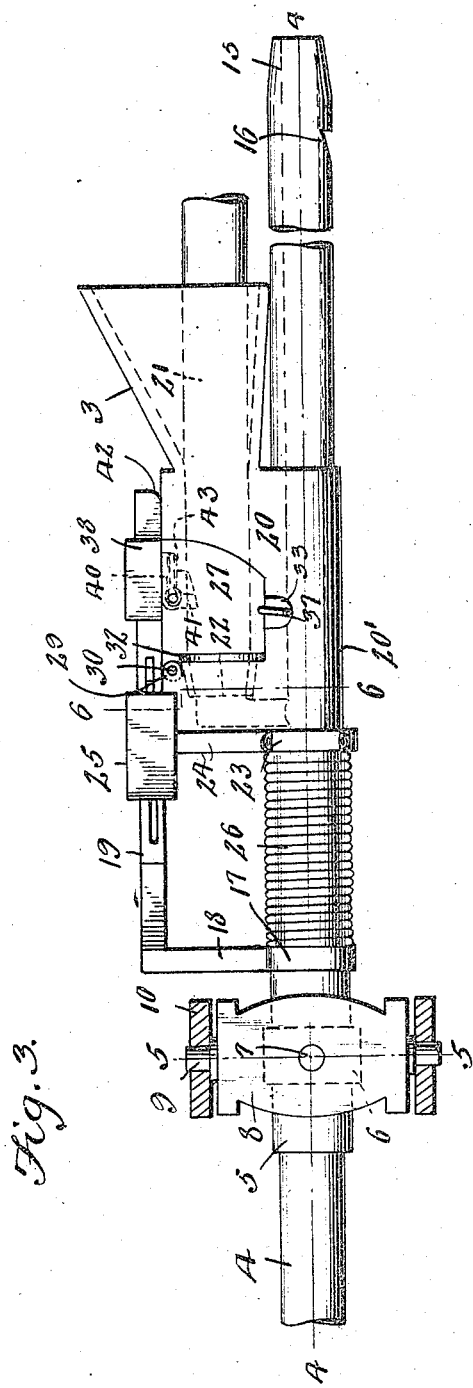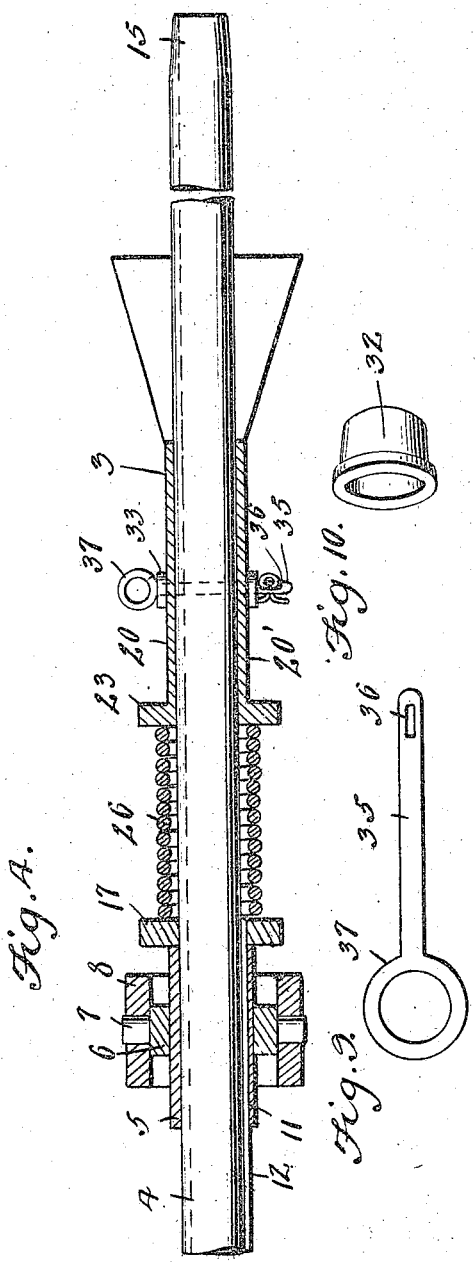

UNITED STATES PATENT OFFICE.

FRED H. SEELY, OF CRESTON, IOWA.

AIR-PIPE COUPLING FOR TRAINS.

1,187,184.   Specification of Letters Patent.   Patented June 13, 1916.

Application filed August 12, 1915. Serial No. 45,177.

*To all whom it may concern:*

Be it known that I, FRED H. SEELY, a citizen of the United States, residing at Creston, in the county of Union and State of Iowa, have invented new and useful Improvements in Air-Pipe Couplings for Trains, of which the following is a specification.

This invention relates to improvements in coupling devices for the brake pipes of trains and has particular application to an automatic pipe coupler.

In carrying out the present invention, it is my purpose to provide an automatic pipe coupling device for trains whereby the brake pipes carried by the individual cars of the train will be connected to one another automatically when the cars are coupled together in train formation and whereby the pipes carried by the individual cars of the train may be automatically disconnected upon the uncoupling of the cars.

It is also my purpose to provide a coupling of the class described whereby a fluid tight joint will be formed between the pipes of the cars of the train when such pipes are connected together and wherein the gasket at the junction of the coupling members may be readily replaced whenever the same has become worn and mutilated.

With the above and other objects in view, the invention consists in the construction, combination and arrangement of parts hereinafter set forth in and falling within the scope of the claims.

In the accompanying drawing, Figure 1 is a fragmentary bottom plan view of two cars coupled together, showing the brake pipes thereof connected by means of my improved coupling. Fig. 2 is a like view showing the parts in uncoupled position. Fig. 3 is an enlarged top plan view of one of the coupling members. Fig. 4 is an enlarged longitudinal sectional view on the line 4—4 of Fig. 3. Fig. 5 is a transverse sectional view on the line 5—5 of Fig. 3. Fig. 6 is a similar view on the line 6—6 of Fig. 3. Fig. 7 is an enlarged fragmentary longitudinal sectional view through one of the coupling members. Fig. 8 is a cross sectional view showing the supporting means for one of the coupling members. Figs. 9 and 10 are views of details of the invention.

Referring now to the drawings in detail, 1, 1 designate the adjacent ends of two cars connected to each other by means of the usual coupling 2 and equipped with companion brake pipe coupling members 3, 3 respectively. Each coupling member 3 comprises a pipe section 4 slidably mounted within a sleeve 5 carried by a block 6 having the upper and lower ends thereof respectively formed with alining trunnions 7 journaled in the top and bottom bars of a substantially rectangular frame 8, the end bars of the frame 8 being formed with outwardly extending axially alining trunnions 9 journaled in hangers 10 depending from the bottom of the particular car 1. In the present instance, the inner surface of the sleeve 5 is formed with a longitudinally extending keyway 11, while the pipe section 4 is equipped with a longitudinally extending key 12 working in the way 11 and acting to hold the pipe section 4 against rotation within the sleeve 5. One end of the pipe section 4 is connected by means of a flexible hose 13 with the adjacent end of the brake pipe 14 of the particular car, while the other end of such section projects outwardly beyond the adjacent car and is formed to provide a nipple 15 and formed in the nipple end of the pipe section 4 is a notch 16. Formed on the outer end of the sleeve 5 concentrically of the pipe section 4 is a flange 17 and formed integral with the flange 17 and projecting laterally therefrom is an arm 18, while secured to the arm 18 and projecting toward the nipple end of the pipe section 4 is a guide rod 19 lying parallel with the pipe.

20 designates a casting formed to provide a sleeve 20' surrounding the pipe section 4 adjacent to the nipple end thereof and fixed thereto, and a tube 21 disposed at one side of the sleeve 20' and having the longitudinal axis thereof parallel with the similar axis of the sleeve 20'. The rear end of the tube 21 opens into the pipe section 4 by way of a passage 22 formed in the casting 20 at right angles to the axis of the tube, while the outer end portion of the tube projects beyond the similar end of the sleeve 20' and increases in diameter from a point adjacent to the sleeve toward the outer end of the tube to provide a relatively large entrance mouth. Formed on the inner end of the sleeve 20' is an annular flange 23 and formed integral with the flange 23 and projecting laterally therefrom parallel with the arm 18 is an arm 24, while secured to the outer end of the arm 24 and slidably mounted upon the guide rod 19 is a guide sleeve 25. Surrounding the pipe section 4 between the flanges 17 and 23 is a coiled expansion spring 26 acting to hold the outer end of the pipe section 4 and the similar end of the tube 21 in normal or projected position and in this position of the pipe section and tube the guide sleeve 25 is disposed at the outer end of the guide rod 19.

The bore of the tube 21 adjacent to the inner end thereof is tapered and the tube is formed with a removable section 27 adjacent to the tapered inner end 26. In the present instance, this removable section 27 is formed with an outwardly projecting pivot knuckle 28 disposed at the rear edge of the section 27 and alining with pivot ears 29 formed on the casting 20 and passed through the alining pivot ears and knuckle is a pivot bolt 30 about which the section 27 may be swung into and out of tube forming position. At the juncture of the rear end of the movable section 27 with the rear end portion of the tube 21 a seat 31 is formed and mounted upon the seat 31 and held thereon by the rear edge of the movable section 27 is a gasket 32 which may be removed from the tube when the section 27 is swung to open position and replaced by a new gasket. Formed on the movable section 27 at the inner side thereof are lugs 33 spaced apart vertically and formed in the lugs 33 are alining openings that register with a bore 34 formed in the casting 20 and passed through these alining openings and bore is a securing pin 35 having the lower end thereof formed with a slot 36 adapted to receive the cotter pin and the upper end formed with a finger hold 37 whereby the securing pin may be removed upon the withdrawal of the cotter pin from the slot 36, thereby permitting the section 27 to be swung to open position. Formed on the outer side of the movable section 27 is a guide sleeve 38 surrounding the adjacent end of the guide rod 19, while formed in the movable section 27 and opening into the sleeve 38 is a longitudinal slot 39 and pivoted within the slot 39 is a bell crank lever 40 having one limb thereof formed to provide a dog 41 adapted to enter the bore of the tube 21 and the remaining limb adapted to lie within the slot 39 when the dog 41 is in the bore of the tube. The outer end of the guide rod 19 is bifurcated as at 42 and when the pipe section 4 and tube 21 are in normal position under the action of the spring 26, as previously described, the limb of the bell crank lever 40 that is adapted to lie within the slot 39 enters the bifurcated end 42 of the rod 19 and so swings the dog 41 out of the tube 21. A spring 43 is preferably secured within the slot 39 and acts upon the adjacent limb of the bell crank lever to swing the latter normally to inactive position, that is, to a position to move the dog 41 out of the bore of the tube 21.

In practice, the nipple end of the pipe section 4 and the tube 21 of each coupling member aline axially with the tube and pipe section respectively of the companion coupling member as clearly illustrated in Figs. 1 and 2 of the drawings and when the cars are coupled together the nipple ends of each pipe section enters the relatively large end of the opposing tube 21. As the nipple end of each pipe section 4 enters the tube 21, such end of the pipe section engages the gasket 32 with the effect to form a fluid tight joint between the members of the coupling and immediately succeeding the nipple 15 engaging the gasket 32, the pipe sections 4 of the respective coupling members slide longitudinally within the sleeves 5 against the action of the springs 26 and in the rearward movement of the pipe sections and the tubes 21 the depending limbs of the bell crank levers 40 ride into engagement with the end walls of the bifurcated ends 42 of the guide rods 19 and are swung inwardly to engage the dogs 41 with the notches 16. In the continued rearward movement of the pipe sections and tubes of the respective coupling members, the bell crank lever is held in locking position and the guide sleeves 38 and 25 slide along the respective guide rods 19. Thus, as long as the cars remain coupled the members of the air brake coupling are locked together. By means of the blocks 6 and frames 8 supporting the respective members of the coupling, such members may move vertically and horizontally so that breaking of the coupling, when the train is rounding a curve, or the car bodies swinging relatively to one another, will be avoided.

In the present instance, each coupling member is surrounded by a substantially rectangular frame 44 secured to the bottom of the particular car and connected with the upper member of the frame 44 and depending therefrom are coiled rectractile springs 45 having the lower ends thereof secured to the flange 23 on the sleeve 5, while secured to the lower member of the frame 44 and projecting upwardly therefrom are coiled retractile springs 46 having the upper ends thereof secured to the flange 23. These springs 45 and 46 cooperate with each other to maintain the coupling member in substantially horizontal position so as to insure the proper coupling of the members when the cars are drawn together.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In an automatic air pipe coupling for cars, companion coupling members carried by the confronting ends of adjacent cars respectively and each comprising a pipe section having one end connected with the brake pipe of the car and the other end projecting beyond the adjacent end of the car and formed with a nipple, a tube secured to the other end portion of said section parallel therewith and in open communication with said section and adapted to receive the nipple end of the pipe section of the companion coupling member, means holding said coupling members normally projected beyond the ends of the respective cars so that such members may interengage in the coupling of the cars, gaskets in the tubes of said coupling members respectively adapted to receive the nipple ends of the companion pipe sections to form fluid tight connections, each tube embodying a movable section capable of movement to open position whereby access may be had to said gasket, and means holding said movable section normally in tube forming position.

2. In automatic air pipe coupling for cars, companion coupling members carried by the confronting ends of adjacent cars respectively and each comprising a pipe section having one end connected with the brake pipe of the car and the other end formed with a nipple, a tube secured to the outer end portion of said section parallel therewith and in open communication with said section and adapted to receive the nipple end of the pipe section of the companion coupling members, and gaskets in the tubes in said coupling members respectively adapted to receive the nipple ends of the companion pipe sections to form fluid tight connections, each tube embodying a movable section capable of movement to open position whereby access may be had to said gasket.

3. In automatic air pipe coupling for cars, companion coupling members carried by the confronting ends of adjacent cars respectively and each comprising a pipe section having one end connected with the brake pipe of the car and the other end formed with a nipple, a tube secured to the outer end portion of said section parallel therewith and in open communication with said section and adapted to receive the nipple end of the pipe section of the companion coupling members, and gaskets in the tubes in said coupling members respectively adapted to receive the nipple ends of the companion pipe sections to form fluid tight connections, each tube embodying a swinging section capable of movement to open position whereby access may be had to said gasket, and means holding said swinging section normally in tube forming position.

In testimony whereof I affix my signature in presence of two witnesses.

FRED H. SEELY.

Witnesses:
M. D. SMITH,
J. V. RICHARDSON.

Copies of this patent may be obtained for five cents each, by addressing the "Commissioner of Patents, Washington, D. C."